US 6,708,914 B2

United States Patent
Stevens

(10) Patent No.: US 6,708,914 B2
(45) Date of Patent: Mar. 23, 2004

(54) SOFT-START PISTON ACTUATOR

(75) Inventor: Bruce A. Stevens, Oakland, MI (US)

(73) Assignee: Automotive Systems Laboratory, Inc., Farmington Hills, MI (US)

(*) Notice: Subject to any disclaimer, the term of this patent is extended or adjusted under 35 U.S.C. 154(b) by 76 days.

(21) Appl. No.: 10/000,723

(22) Filed: Oct. 31, 2001

(65) Prior Publication Data

US 2002/0109029 A1 Aug. 15, 2002

Related U.S. Application Data

(60) Provisional application No. 60/244,554, filed on Oct. 31, 2000.

(51) Int. Cl.[7] .............................................. B60R 22/46
(52) U.S. Cl. .......................... 242/374; 280/806; 60/632
(58) Field of Search ........................ 242/374; 280/806; 297/478, 480; 60/632, 638

(56) References Cited

U.S. PATENT DOCUMENTS

| 4,237,690 A | * 12/1980 | Tsuge et al. ............... 280/806 |
| 4,750,759 A | 6/1988 | Escaravage ............... 280/806 |
| 4,932,603 A | 6/1990 | Yamanoi et al. |
| 5,222,994 A | 6/1993 | Hamaue |
| 5,397,075 A | 3/1995 | Behr ........................... 242/374 |
| 5,451,008 A | 9/1995 | Hamaue ...................... 242/374 |
| 5,553,803 A | 9/1996 | Mitzkus et al. ............. 242/374 |
| 5,588,608 A | 12/1996 | Imai et al. .................. 242/374 |
| 5,641,131 A | 6/1997 | Schmid et al. ............. 242/374 |
| 5,667,161 A | 9/1997 | Mitzkus et al. ............. 242/374 |
| 5,697,571 A | 12/1997 | Dybro et al. ................ 242/374 |
| 5,743,480 A | 4/1998 | Kopetzky et al. ........... 242/374 |
| 5,782,423 A | * 7/1998 | Miller et al. ................ 242/374 |
| 5,839,686 A | 11/1998 | Dybro et al. ................ 242/374 |
| 5,853,135 A | 12/1998 | Dybro et al. ................ 242/374 |
| 5,863,009 A | * 1/1999 | Bauer et al. ................ 242/374 |
| 5,899,399 A | 5/1999 | Brown et al. ............... 242/324 |
| 5,906,328 A | 5/1999 | Hamaue et al. ............. 242/374 |
| 5,944,350 A | 8/1999 | Grabowski et al. ......... 280/806 |
| 5,967,440 A | 10/1999 | Marshall .................... 242/374 |
| 5,988,680 A | * 11/1999 | Wier .......................... 280/806 |
| 6,000,655 A | 12/1999 | Coppo ........................ 242/374 |
| 6,036,274 A | 3/2000 | Kohlndorfer et al. ........ 297/480 |
| 6,139,058 A | 10/2000 | Bohmler ..................... 280/806 |
| 6,149,095 A | * 11/2000 | Specht et al. ............... 242/374 |
| 6,340,176 B1 | * 1/2002 | Webber et al. .............. 280/806 |
| 6,419,177 B2 | * 7/2002 | Stevens ....................... 242/374 |

FOREIGN PATENT DOCUMENTS

| DE | 32 31 509 A1 | 3/1994 |
| DE | 100 10 379 A1 | 9/2000 |

* cited by examiner

Primary Examiner—John M. Jillions
(74) Attorney, Agent, or Firm—Dinnin & Dunn, P.C.

(57) ABSTRACT

A seatbelt pretensioner (10, 210, 310) with a soft-start piston actuator (50) is provided. The pretensioner (10, 210, 310) cooperates with a webbing reel shaft (112, 212, 312) of a seatbelt retractor webbing reel (not shown). The pretensioner (10, 210, 310) includes a housing (16, 216, 316) with at least one passage, and preferably two volumetrically intersecting perpendicular passages (18, 218, 318; 20, 220, 320). A clutch assembly (30, 230, 330) is fixed within the first passage (18, 218, 318), and a webbing reel shaft (12, 212, 312) extends axially through the clutch assembly (30, 230, 330). A soft-start piston actuator (50) with at least a first pressure surface (54) and a second pressure surface (56) is positioned in the second passage (20, 220, 320), and is actuatable with a gas generant composition (60, 260) that produces pressurized gas upon signaling from a remote sensor (not shown). The pressurized gas pushes the piston actuator (50) through the second passage (20, 220, 320) at a first rate when the smaller of two pressure surfaces (54) is acted upon, and at a second rate when it acts upon the larger of two pressure surfaces (56). Actuation of the piston actuator (50) thusly tensions a strap (40, 240, 340) extending across the second passage (20, 220, 320), inducing rotary advancement of the clutch assembly (30, 230, 330) and the operably connected webbing reel shaft (12, 212, 312), winding the attached seatbelt webbing (not shown). A method of pretensioning a seatbelt (not shown) in the event of a sudden vehicle deceleration is also provided.

21 Claims, 5 Drawing Sheets

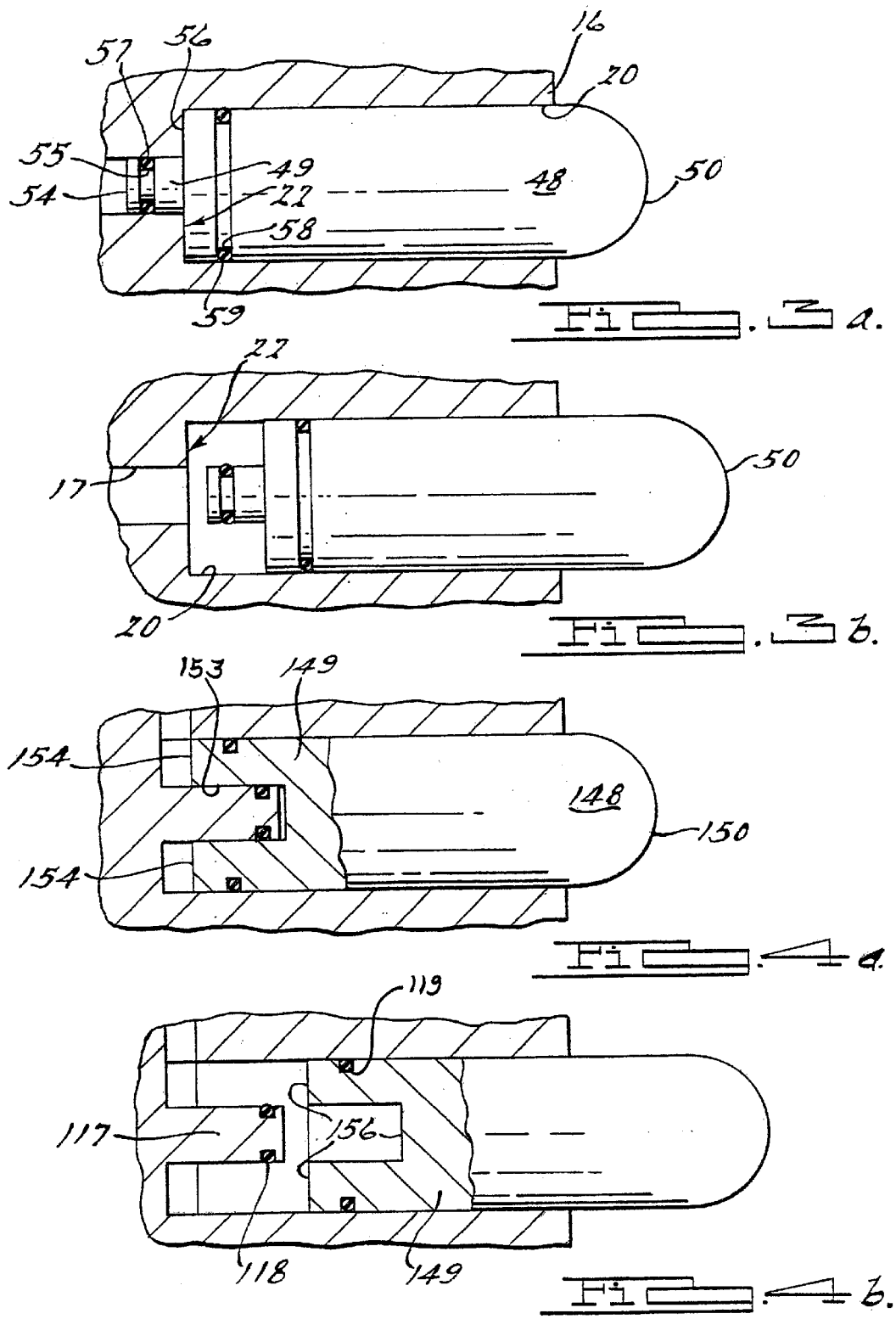

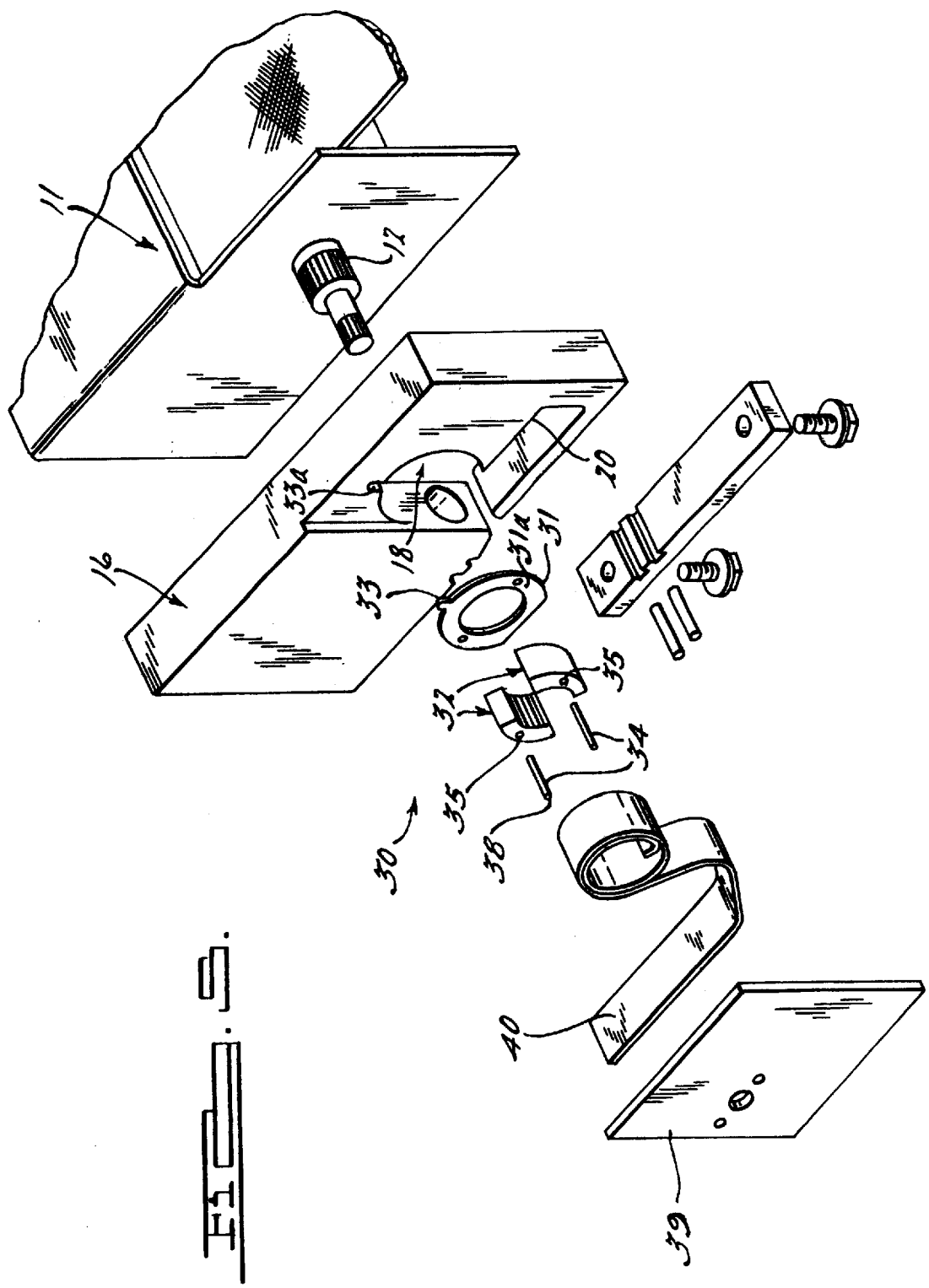

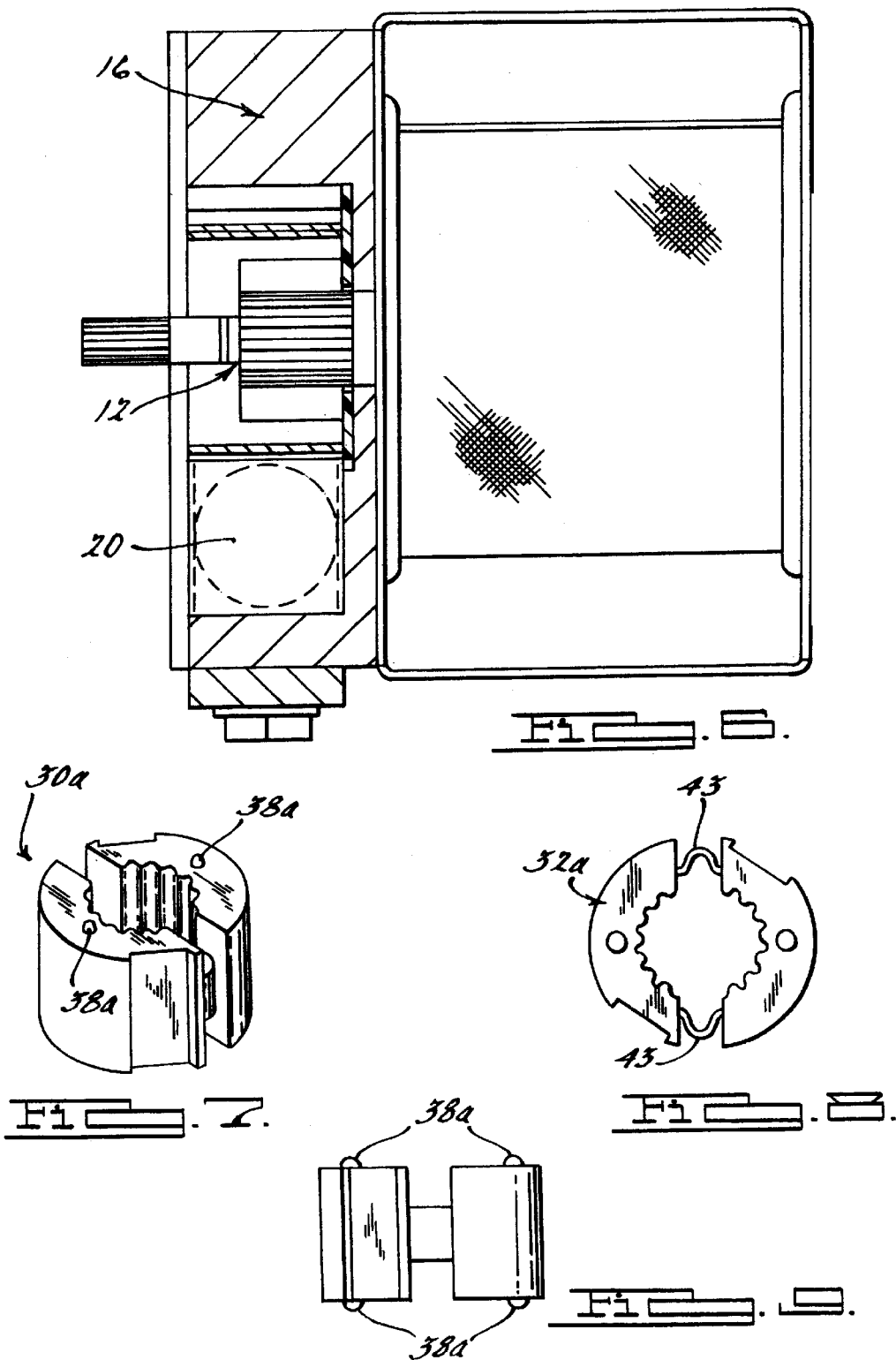

SOFT-START PISTON ACTUATOR

This application claims the benefit of provisional application No. 60/244,554 filed Oct. 31, 2000.

TECHNICAL FIELD

The present invention relates in general to seatbelt pretensioners and, more particularly, to a pretensioner that incorporates a soft-start piston actuator.

BACKGROUND OF THE INVENTION

Seat belt pretensioners remove slack from a seat belt in the event of a collision in order to minimize forward movement of the passenger. While it is known to use pyrotechnic gas generators to operate mechanisms that wind up or otherwise pull in slack in the seat belt during a collision, such known pyrotechnic gas generators are often disposed internally of a seat belt retractor. Thus, the vehicle owner is faced with a significant cost penalty in that the entire pretensioner and retractor assembly must be replaced after activation because of the inability to prevent degradation of the retractor. High-temperature gases tend to abrade interior metal surfaces and produce ash and clinkers that bind up the retraction mechanism.

Further, where pyrotechnic gas generators are used to supply the rapidly increasing gas pressure, the gas pressurization rate and the resultant initial driving force or acceleration of the piston can exceed the structural capability of the driven components. As a result, the entire assembly can malfunction due to fracturing of a given part.

Another problem with known pretensioners is that they are designed to activate only in severe accidents, for example, accidents that exhibit inertial forces at least sufficient to activate the vehicle airbags. Safety system designers generally choose such a relatively high activation threshold due to the expense of replacing the entire seat belt retractor and pretensioner assembly after activation. As a result, seat belt pretensioners oftentimes may not protect passengers in less severe accidents. A related problem with known pretensioners is that when the pretensioner is activated only in severe accidents, activation will likely come relatively late in the crash sequence. Thus, the pretensioner must rapidly take up slack in the seat belt, sometimes injuring the passenger.

U.S. Pat. No. 5,967,440, herein incorporated by reference, describes a pretensioner and a conventional retractor for a safety belt system. The pretensioner is relatively complex and large, thus increasing the weight and spatial requirements of the seatbelt assembly.

U.S. Pat. No. 5,899,399, herein incorporated by reference, describes a state of the art pretensioner. The pretensioner is relatively complex, therefore complicating the manufacturing process.

U.S. Pat. No. 5,944,350, herein incorporated by reference, also describes a state of the art pretensioner. Again, the pretensioner is relatively large, thus increasing the weight and spatial requirements of the seatbelt assembly.

The present invention is directed to overcoming one or more of the problems or limitations associated with the prior art.

SUMMARY OF THE INVENTION

In one aspect of the invention, a seatbelt pretensioner incorporates a soft-start piston actuator. The seatbelt pretensioner cooperates with a webbing reel shaft axially disposed within a seatbelt retractor reel. The seatbelt pretensioner preferably includes a housing having a first passage in volumetric intersection with a second passage. The webbing reel shaft extends through the first passage. The second passage has a first end and a second end, the second end extending across and past the diameter of the first passage. A clutch assembly is also provided, and as seen in a preferred embodiment, is fixed within the first passage. The webbing reel shaft extends through the clutch assembly. The seatbelt pretensioner is further equipped with a strap that has a first end fixed to the housing, a portion extending across a section of the second passage, and a second end coiled about and fixed to the clutch assembly. Still further, the seatbelt pretensioner provides a soft-start piston actuator with at least two pressure surfaces, wherein the actuator is positioned adjacent the first end of the second passage. A gas generant composition is also provided that is ignitable to supply pressurized gas that initially acts upon one of the at least two pressure surfaces with a resultant force great enough to drive the actuator a predetermined distance. As the actuator is propelled forward, the pressurized gas subsequently exerts a greater resultant force on at least one additional pressure surface. As the actuator is driven forward, it tensions the strap, thus resulting in a peripheral force about the clutch assembly. A simultaneous rotary advancement of the clutch assembly, the webbing reel shaft, and the webbing reel therefore tensions the attached seatbelt webbing.

In a second aspect, a method of pretensioning a seatbelt is provided. The pretensioning method includes the steps of providing a housing with at least one passage, the passage having a first end and a second end, and providing a gas generator in fluid communication with the first end of the passage for providing a gas pressure thereto. The method also includes the steps of providing an actuator with at least a first and a second pressure surface, and positioning the actuator proximate the first end of the passage. The actuator and the passage are in flush communication at the first end. Further, the method includes the steps of operably coupling the actuator to a seatbelt retractor webbing reel with a strap or cord, and activating the gas generator to initially provide a gas pressure to the first pressure surface. Subsequently, the gas pressure is supplied to the second pressure surface of the actuator, thereby driving the actuator from the first end toward the second end of the passage. Driving the actuator in this fashion tensions the strap and winds the seatbelt retractor webbing reel with a more gradual increase in velocity, thereby pretensioning the seatbelt webbing thereon. By first driving the actuator at a lesser velocity, then incrementally increasing the velocity, by increasing the surface area of the actuator acted upon by gas pressure, damage to the various system components is avoided.

BRIEF DESCRIPTION OF THE DRAWINGS

FIGS. 3a–3b are partial side views of the soft-start piston actuator from FIG. 1;

FIGS. 4a–4b are partial side views of an alternative embodiment of a soft-start piston actuator;

FIG. 5 is a partial exploded view of the present invention;

FIG. 6 is a cross-sectional view of the pretensioner of FIG. 1 taken along the line A—A;

FIG. 7 is a perspective view of a one-piece injection molded clutch assembly or coupling mechanism in accordance with the present invention;

FIG. 8 is a top view of the clutch assembly of FIG. 7;

FIG. 9 is a side view of the clutch assembly of FIG. 7;

DETAILED DESCRIPTION

Figure 1:
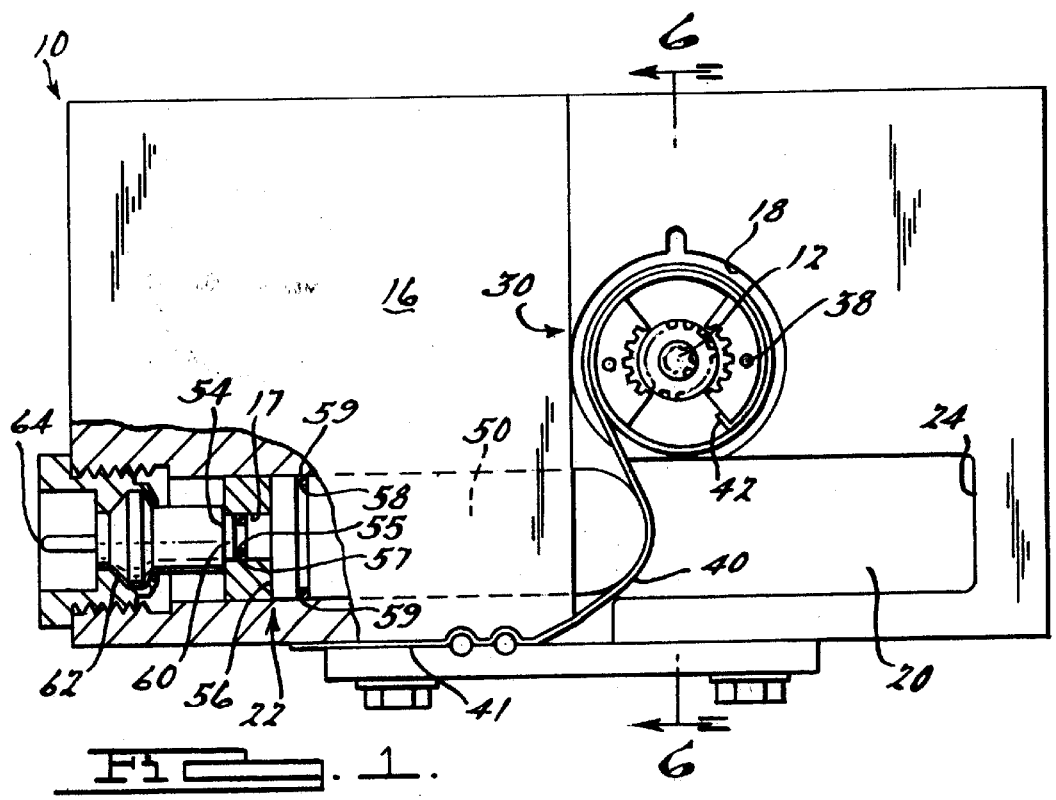
FIG. 1 is a diagrammatic side view, partially in cross-section, of a seat belt pretensioner with a soft-start piston actuator, shown in its inactivated position.

Referring to FIG. 1, there is shown a pretensioner 10 in accordance with a preferred embodiment of the present invention. Pretensioner 10 may be used to pretension a seat belt (not shown) wound about a webbing reel of a conventional seat belt retractor mechanism. "Pretensioning" is generally defined as taking up slack in a seat belt in the event of sudden deceleration, or a collision. A webbing reel retractor shaft 12 extends from the retractor into pretensioner 10, and thereby cooperates with pretensioner 10 to tighten the seatbelt in the event of a sudden deceleration or an accident. The pretensioner 10 of the present invention has generic application to seatbelt retractors. Examples of typical seat belt retractors to which the pretensioner of the present invention has application are taught in U.S. Pat. Nos. 4,558,832 and 4,597,546. These examples are for illustrative purposes only and should not be construed to limit the scope of the present invention. The teachings of these patents, as well as those of all patents cited herein, are incorporated by reference.

Pretensioner 10 includes a housing 16 which is preferably a unitary block 16 formed from steel, aluminum, metal alloys, plastic and/or other known materials suitable for use in a pretensioner and for containment of the components described below. In a preferred embodiment, housing 16 is formed with a first passage 18 which volumetrically intersects a second passage 20. First passage 18 is preferably cylindrical and oriented perpendicular to second passage 20, which is preferably substantially coextensive with the length of housing 16. A webbing reel shaft 12 of a seatbelt retractor reel (not shown) extends through first passage 18, and also axially extends through a clutch assembly 30 which is fixed within first passage 18. Second passage or cylindrical bore 20 is preferably rectangular and has a first end 22, and a second end 24 that extends across and past the diameter of the first passage 18. A flexible strap 40 is provided having a first end 41 that is secured to housing 16, and a second end 42 coiled about and secured to clutch assembly 30. Strap 40 is preferably a metallic strip, but some other suitable flexible material such as a metal cord might be substituted.

In accordance with the present invention, pretensioner 10 also provides an actuator or piston 50, positioned proximate the first end 22 of second passage 20. The actuator component(s) may be die cast, molded, or otherwise formed from metal, plastics, other suitably rigid materials, and combinations thereof. Referring now to FIGS. 3a–3b, actuator 50 has a body portion 48 and an extension portion 49, both preferably cylindrical. Stated another way, actuator 50 preferably has an essentially cylindrical portion with a first diameter, and has a cylindrical protrusion 49 that has a smaller second diameter. Extension portion 49 and body portion 48 are preferably axially aligned. It should be appreciated that actuator 50 need not be cylindrical, and various deviations from the design of the disclosed embodiments might be made without departing from the scope of the present invention. For instance, actuator 50 might be flat-sided, or even rectangular in cross section. Actuator 50 might be constructed as a single piece or, alternatively, as a plurality of pieces or segments. Further, extension portion 49 need not be axially aligned with body portion 48. In a preferred embodiment, extension portion 49 is insertable into a restriction portion 17 of housing 16 in a close clearance fashion. A first pressure surface 54, that is preferably circular, is located on extension portion 49. Piston 50 has a second pressure surface 56, that is located in part on body portion 48 and is preferably an annular surface circumferentially surrounding the base of extension 49. Second pressure surface 56 also includes a portion 54 located on extension portion 49. Second pressure surface 56 thus includes first pressure surface 54, by definition having a larger surface area than first pressure surface 54. In a preferred embodiment, first pressure surface 54 and second pressure surface 56 are circular and share a common centerpoint (not shown). A first annulus 55 and a second annulus 58 are preferably machined around the circumference of actuator 50 on extension portion 49 and body portion 48, respectively. A pair of flexible O-rings, 57 and 59, are preferably snap-fined into annuli 55 and 58, thereby preventing the passage of gas through second passage 20 at their contact points. Referring to FIGS. 4a–4b, there is shown an alternative actuator piston 150. Piston 150 has a body portion 148 and an extension portion 149, each preferably cylindrical. Similar to piston 50, piston 150 has a first pressure surface 154, and a second pressure surface 156 that includes first pressure surface 154. Piston 150 differs from piston 50, however, in that it includes a bore 153, that insertably receives a protrusion portion 117 of the housing 116. An O-ring 118 is preferably snap-fitted around protrusion portion 117 to form a gas-tight seal, while a second O-ring 119 is snap-fined around extension portion 149.

Figure 2:
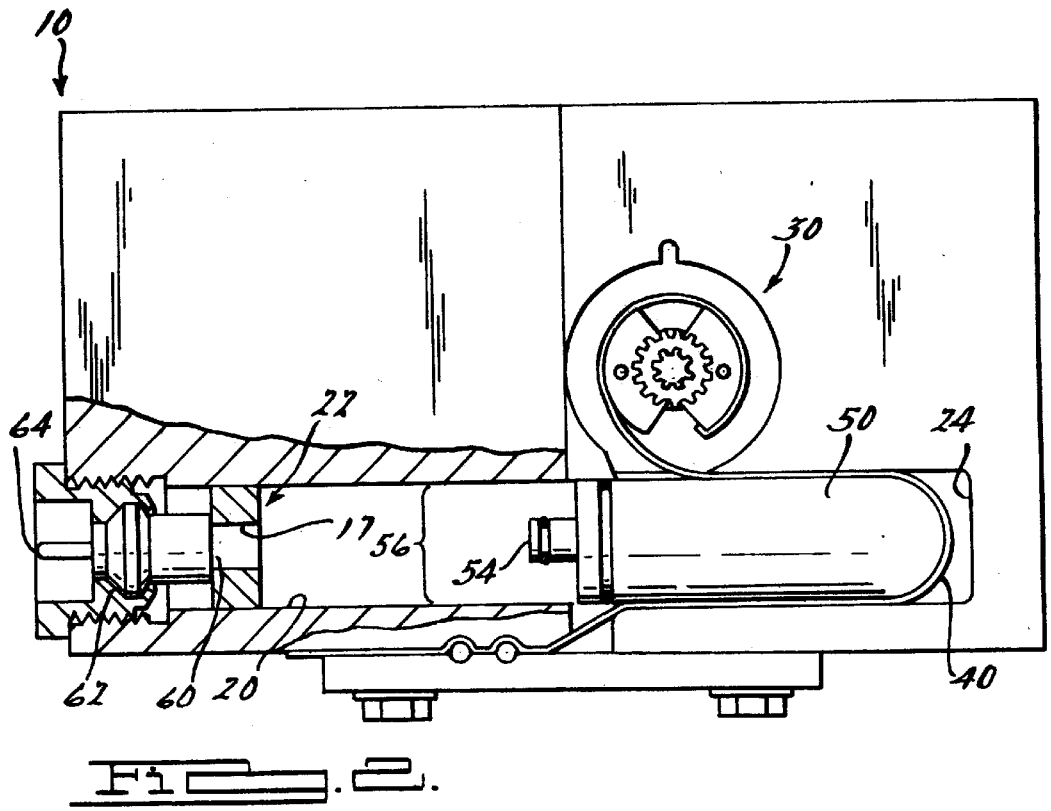
FIG. 2 is a similar view of the embodiment from FIG. 1, illustrating the soft-start piston actuator in its activated position.

Returning to FIGS. 1 and 2, a gas generant composition 60 is provided and preferably placed adjacent first pressure surface 54, and within restriction portion 17. An initiator 62 is attached to housing 16, and abuts the first end 22 of second passage 20. In FIGS. 1 and 2, initiator 62 is threadedly received by housing 16, although some other known suitable attachment method such as welds might be used. The illustrated position and orientation of initiator 62 might be varied without departing from the scope of the present invention, depending on space and manufacturing requirements. Further, initiator 62 need not be positioned within housing 16 at all. A set of contacts 64 can provide electrical current to initiator 62 to ignite gas generant 60 when activation of pretensioner 10 is desired. The supply of electrical current can be controlled by a sensor, for example an accelerometer, positioned elsewhere in the vehicle in a conventional manner. Gas generants useful in conjunction with the present invention are gas generants well known to those of ordinary skill in the art. For examples, see U.S. Pat. Nos. 5,035,757, 5,460,668, 5,756,929, and 5,872,329, each herein incorporated by reference. These compositions exemplify, but do not limit, useful gas generant compositions.

Referring now to FIG. 5, clutch assembly 30 is fixed about the retractor shaft 12, whereby the shaft 12 functions as an axis of rotation. As illustrated, clutch assembly 30 is fixed to a clip 31 with a perimeter roughly equivalent to that of first passage 18 and a key 33 corresponding to a female counterpart 33a in passage 18. Clip 31 is thus key-fitted within first passage 18, preventing rotation upon activation of clutch assembly 30. Clutch assembly 30 further includes first and second segments 32. A set of shear pins 34 are press-fitted through bores 35 through each segment 32. The shear pins 34 form slight protrusions 38 through the respective upper and lower surfaces of the segments 32. The protrusions 38 thus secure one end of each segment 32 to corresponding bores 31a in the clip 31. At the other end of the segments 32, the protrusions 38 may be held in place by indentations (not shown) formed within a cover 39, or, another clip may be used to secure the segments 32 from the coiled energy of the strap 40 during normal vehicular operation. When the segments 32 are fixed in place, the retractor shaft 12 rotates freely of the segments 32 except when pretensioner 10 is activated. FIGS. 6–9 illustrate an alternative one-piece injection molding of a clutch assembly 30a. Clutch assembly 30a includes protrusions 38a integral to segments 32a, thereby securing the clutch assembly 30a to clip 31. Segments 32a are joined together by two spring members 43.

In general, the clutch assemblies illustrated herein are merely exemplary of the many known clutches useful in the art. Accordingly, as used herein, the term "clutch assembly" is meant to apply generically to any clutch component or combination of components that are useful in the seatbelt retractor and pretensioner art. Stated another way, a clutch assembly is any component or combination of components that exert a rotatable and circumferential force about the retractor shaft 12 and thus produce a pretensioning or tightening of the belt by winding the associated webbing reel. U.S. Pat. Nos. 5,743,480 and 5,222,994 illustrate known alternatives, and are herein incorporated by reference.

Returning now to FIGS. 1 and 2, when activation of pretensioner 10 is desired, for example in the event of a crash, a sensor (not shown) communicates electrical current via contacts 64 to initiator 62 in a conventional manner. The energizing of initiator 62 causes the combustion of gas generant composition 60 in restriction portion 17 of housing 16. Consequently, the gas pressure in restriction portion 60 begins to rise extremely rapidly, as does the pressure acting on first pressure surface 54. When a sufficient level of gas pressure is reached, piston 50 begins to move through second channel 20 toward second end 24, pushing against strap 40 and activating clutch assembly 30, initiating rotation of reel shaft 12. O-ring 57 prevents any significant amount of combustion gas from prematurely escaping into second passage 20. When piston 50 has traveled a predetermined distance, pulling extension portion 49 out of restriction portion 17, pressurized gas can flow around extension portion 49 to exert force on second pressure surface 56, which includes the entire piston surface area exposed to gas pressure at first end 22 of second passage 20. O-ring 59 prevents any significant amount of gas from flowing past piston 50. When piston 50 is in this position, with extension portion 49 freed from restriction portion 17, pressurized gas from the combustion of gas generant 60 can act on piston 50's total exposed surface area. Because the total force acting on piston 50 is defined by the gas pressure and the exposed surface area, the resultant force on piston 50 increases once piston 50 has traveled far enough to expose second pressure surface 56. As a result, piston 50's rate of travel through second passage 20 is initially relatively slow when pressure is acting only on the relatively lesser surface area of first pressure surface 54, but becomes relatively fast once gas pressure can act on the relatively greater surface area of second pressure surface 56. The result is a relatively soft start, allowing the piston travel rate to be increased gradually, thus preventing damage to the various components that could hinder proper activation of pretensioner 10.

The embodiment of the present invention shown in FIG. 4 functions in much the same manner, however, the different geometry illustrates how a varying design accomplishes the same goal without departing from the present invention's scope. Once second pressure surface 56 is acted upon, piston 50 preferably travels to passage 20's second end 24 relatively rapidly, forcing a portion of strap 40 to second end 24 as illustrated in FIG. 2. In manufacturing pretensioner 10, the relative sizes of the surface areas 54 and 56 may be varied to reconcile the acceleration of the actuator 50 with various design criteria of the pretensioner 10. Any number of different pressure surfaces might be incrementally employed during the pretensioner 10 activation, thereby facilitating enhanced control over the acceleration of the actuator 50, depending upon the application.

Referring also to FIG. 5, strap 40 is preferably wrapped at least twice around the periphery of segments 32, and then hooked in place about an edge of either segment 32. As the actuator 50 propels the strap 40 to the second end 24 of passage 20, strap 40 tightens about the clutch assembly 30, shearing pins 34, and exerting a peripheral force about clutch assembly 30. The forward motion of actuator 50 thus results in compression and constriction of the clutch segments 32 about the retractor axle 12. Rotary movement of clutch assembly 30 and webbing reel shaft 12 is thus effected as the associated teeth of segments 32 mate with the associated teeth of shaft 12. Clutch operation therefore results in rotation of webbing reel 12 of the retractor and tightening or pretensioning of the associated belt webbing. Cover 39 encloses the passages 18 and 20 and the components contained therein.

Figure 10:
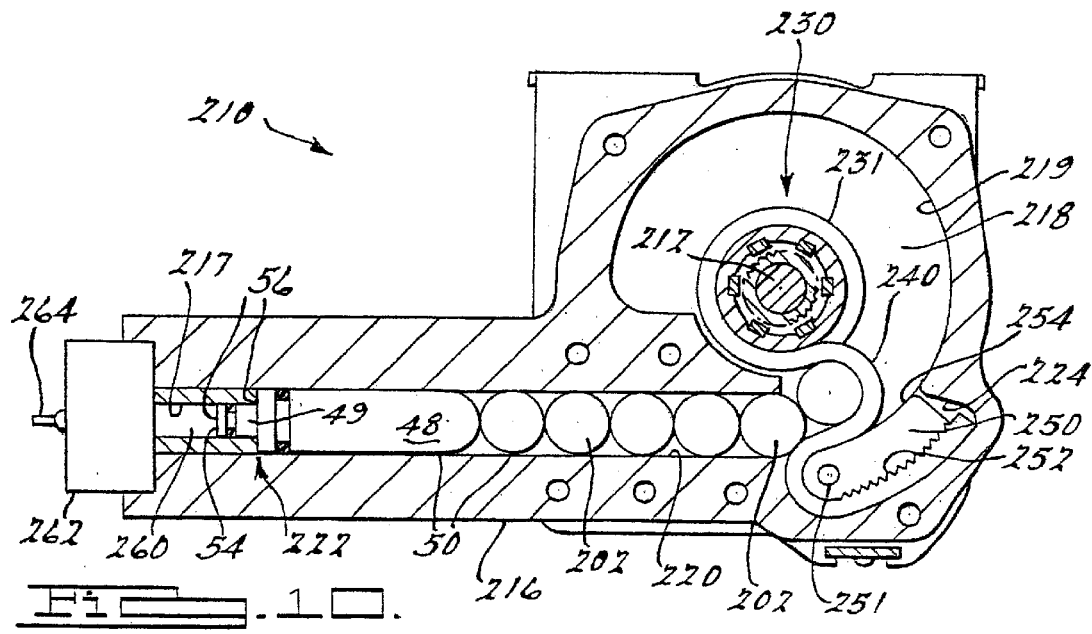
FIG. 10 is a side view of an alternative embodiment of the present invention.

Referring to FIG. 10, there is shown an alternative embodiment of the present invention, a seatbelt pretensioner 210 employing non-linear actuator travel and a multi-piece actuator. Pretensioner 210 includes a housing 216 with a first passage 218 and a second passage 220. Second passage 220 has a first end 222, and a second end 224. Second end 224 is preferably essentially arcuate shaped, and houses a clamping element 250 with a plurality of teeth 252 which secures one end of a flexible strap 240. Clamping element 250 is secured at one end by a pin 251, about which it can pivot within housing 216, leaving the opposite end of clamping element 250 free. The other end of strap 240 is attached to a clutch/coupling assembly 230 that is fixed to a rotatable shaft 212, and housed within first passage 218. Preferably, clamping element 250 has an inside surface 254 which forms a part of an arcuate path traversed by the actuator 50. The remaining portion of the arcuate path is defined by housing 216, and includes the outer wall 219 of first passage 218, and the outer portion 231 of clutch assembly 230. Actuator 50 is preferably comprised of the piston 50 illustrated in FIGS. 1 and 2, and a plurality of bearing members 202, which are preferably cylindrical rotating elements, although some suitable alternative such as ball bearings might be used. Similar to the aforementioned embodiments, piston 50 has a cylindrical extension 49, a body portion 48, and at least two pressure surfaces 54 and 56. An initiator 262 is provided, and can receive signals from a sensor via a set of contacts 264 to activate pretensioner 210 in a conventional manner. Initiator 262 may be attached in any suitable manner known in the art. A gas generant composition 260 similar to that used in a preferred embodiment is preferable.

Actuator piston 50 is positioned adjacent the endmost bearing member 202. When pretensioner 210 is activated by igniting gas generant 260, actuator piston 50 pushes against the endmost bearing member 202, which in turn serially communicates force to the adjacent members 202. Because bearing members 202 are freely rotatable, friction among the elements is minimized. As piston 50 moves toward the second end 224 of second passage 220, bearing members 220 are forced ahead, traversing the arcuate path defined by the inner side 254 of clamping element 250, by outer wall 219, and by clutch/coupling assembly 230, driving strap 240 ahead. The use of multiple, rotatable bearing members thus allows the linear force from piston 50 to be converted into circumferential force about clutch/coupling assembly 230. Because clamping element 250 freely pivots about pin 251, the driving force of bearing members 202 can force the teeth 252 of clamping element 250 against strap 240, ensuring it is held securely. The travel of actuator 50 about its arcuate path thus tensions strap 240 and winds reel 212 via the rotation of coupling assembly 230.

Figure 11:
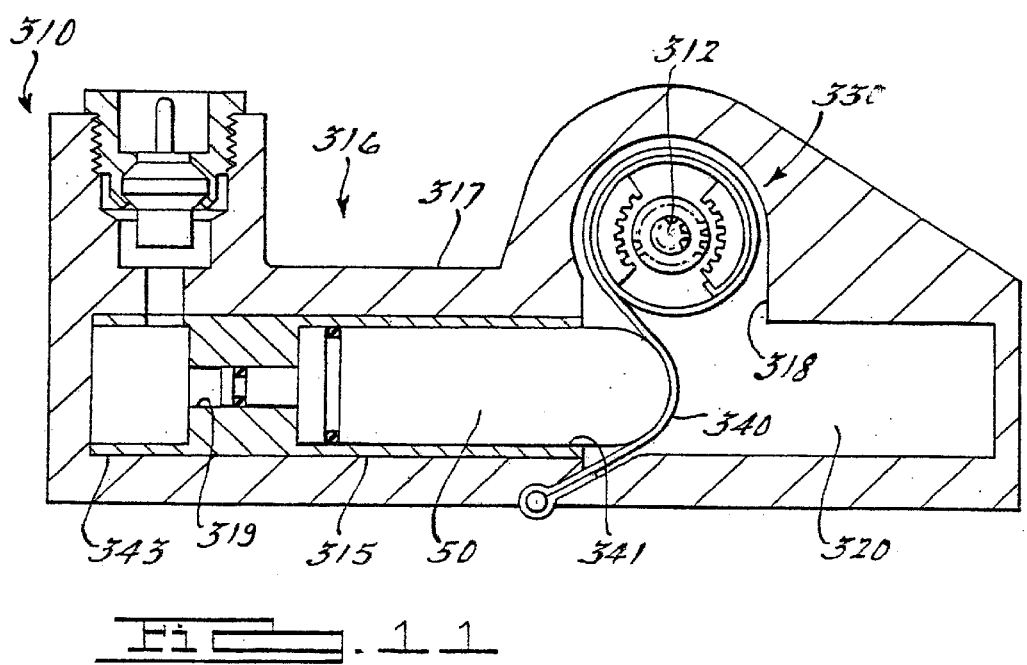
FIG. 11 is a side view of a second alternative embodiment of the present invention.

Referring to FIG. 11, there is shown an additional alternative embodiment of the present invention wherein a seatbelt pretensioner 310 has a housing 316 that includes a block portion 317 and a resilient cylindrical sleeve 315. Many of the features of pretensioner 310 are similar to the features of the previously disclosed embodiments. Sleeve 315 has a first, closed, end 343, and a second, open, end 341, and includes a portion of a second passage 320. Sleeve 315 defines a restriction portion 319 similar to that in the previously disclosed embodiments. Housing 316 defines a first passage 318, within which a clutch assembly 330 is positioned about a rotatable reel 312. Second passage 320 is defined in part by block portion 317, and also in part by sleeve 315. An actuator 50, which is preferably a one-piece piston as in a preferred embodiment, is positioned within sleeve 315, and functions to tension a flexible strap 340 when driven through second passage 320. This embodiment of the present invention allows the invention to be constructed with alternative materials, and is lighter in weight than the aforementioned embodiments. The resilient cylindrical sleeve 315 is preferably a steel cylinder with relatively high structural integrity. Each of the disclosed embodiments have different advantages, and will find application in different environments, depending on the particular manufacturing requirements as well as available mounting space and configuration in a vehicle.

Thus, in accordance with the presently disclosed embodiments of the present invention, the movement of the actuator and straps provide a multiplier effect similar to that provided by geared motion multipliers. The present invention, however, simplifies the design and manufacturing of known motion multipliers and yet retains the multiplier advantage of reducing the strap or actuator stroke requirement. The substantially sealed housing minimizes the release of gas, noise, and flame. The use of at least two pressure surfaces on the piston actuator allows the piston to be accelerated gradually, minimizing the dangers and problems associated with the use of pyrotechnics to power the piston motion. Because the pretensioner is positioned remote from the seatbelt retractor mechanism, after activation of the pretensioner only the pretensioner need be replaced. In general, all or most of the retractor mechanism will be salvageable after pretensioner use.

In sum, the invention can be characterized as a seatbelt pretensioner comprising, (1) a housing with at least one passage, the passage having a first end and a second end, and (2) a gas generator in fluid communication with the first end of the passage for providing a gas pressure thereto, wherein the pretensioner contains an actuator having at least a first and a second pressure surface such that each surface respectively occupies a plane substantially parallel to the other. The surfaces are oriented proximate the first end of the passage, and, the actuator and the passage are in flush communication at the first end. Upon pretensioner activation, the gas generator initially provides a gas pressure to the first pressure surface, and then subsequently to the second pressure surface of the actuator thereby driving the actuator from the first end toward the second end of the passage, and thus winding a seatbelt retractor reel associated therewith. The seatbelt webbing of a seatbelt retractor is thereby pretensioned.

It should be understood that the present description is for illustrative purposes only, and is not intended to limit the scope of the present invention in any way. Thus, those skilled in the art will recognize that various modifications and alterations to the presently disclosed embodiments could be made without departing from the spirit and scope of the present invention. Other aspects, features, and elements of the invention are evident upon examination of the figures and appended claims.

What is claimed is:

1. A seatbelt pretensioner in cooperation with a seatbelt retractor reel, the pretensioner comprising:

a housing with at least one passage, the passage having a first end and a second end;

a flexible member having an end secured to said housing and extending across said at least one passage;

a gas generator in fluid communication with the first end of the passage for providing a gas pressure thereto; and an actuator movable in said passage and having at least a first and a second pressure surface, said first pressure surface located on an end face of said actuator;

wherein upon pretensioner activation the gas generator initially provides a gas pressure to the first pressure surface, then to the second pressure surface, thereby driving the actuator from the first end toward the second end of said passage, simultaneously driving said flexible member toward said second end.

2. The pretensioner of claim 1 wherein said actuator comprises:

a piston having a body and an extension;

said first pressure surface is located on said extension; and said second pressure surface includes at least a portion located on said body;

wherein said driving of the actuator from the first end toward the second end of the passage includes driving said actuator at a relatively lesser velocity, followed by driving said actuator at a relatively greater velocity.

3. The pretensioner of claim 2 wherein:

said extension is cylindrical, and is insertably received in a close-clearance fashion in a cylindrical restriction defined by said housing; and said gas generator is positioned adjacent said first pressure surface, and operable to release pressurized gas, which acts sequentially upon said first pressure surface to drive said piston a first distance at said lesser velocity then upon said second pressure surface to drive said piston a second distance at said greater velocity.

4. The pretensioner of claim 2 wherein said actuator traverses a substantially straight path.

5. The pretensioner of claim 2 wherein said actuator includes a piston and a plurality of bearing members, said actuator traversing a partially arcuate path.

6. The pretensioner of claim 1 wherein:

said housing includes a first passage volumetrically intersecting a perpendicular second passage;

a webbing reel shaft and a clutch assembly are fixed within said first passage, said webbing reel shaft extending axially through said clutch assembly; and a strap having a first end fixed to said housing, a portion extending across a section of said second passage, and a second end coiled about and fixed to said clutch assembly;

said driving of said actuator thereby effecting a tensioning of the strap and a peripheral force about the clutch assembly, and then a simultaneous rotary advancement of the clutch assembly, the webbing reel shaft, and the webbing reel, thus winding the reel and tensioning the seatbelt webbing thereon.

7. A method of pretensioning a seatbelt, comprising the steps of:

providing a housing with at least one passage, the passage having a first end and a second end;

providing a gas generator fluidly connected with the first end of the passage for providing a gas pressure thereto;

positioning an actuator proximate the first end of the passage;

operably coupling the actuator to a seatbelt retractor webbing reel via a flexible member extending across said at least one passage;

activating the gas generator to supply an initial force to the actuator then a greater force to the actuator, thereby driving the actuator from the first end toward the second end of the passage, to drive the seatbelt retractor webbing reel, and tension seatbelt webbing thereon.

8. The method of claim 7 wherein the step of providing an actuator further comprises providing a piston having a body portion with at least one extension portion;

locating a first pressure surface on the extension portion;

locating a second pressure surface in part on the body portion to circumferentially enclose the extension portion, and in part on the extension portion, the second pressure surface being larger than the first pressure surface.

9. The method of claim 8 wherein the step of providing a gas generator further includes positioning a gas generant adjacent the first pressure surface, the generant being ignitable to supply pressurized gas, acting on the first pressure surface to drive the piston a first distance at a lesser velocity, then acting upon the second pressure surface to drive the piston a second distance at a greater velocity.

10. The method of claim 7 wherein the step of activating the gas generator is characterized by igniting a gas generant compound proximate the first end of the passage, thereby supplying pressurized gas to a first pressure surface of the piston at a first actuator position, then supplying pressurized gas to a second pressure surface at a second actuator position.

11. A seatbelt pretensioner assembly comprising:

a housing having a passage with a first end and a second end;

a flexible member having a first end wound about a seatbelt retractor reel and a second end secured to said housing, said flexible member extending across said passage;

a piston having a plurality of pressure surfaces, said piston movable in said passage from said first end to said second end;

a gas actuator operative to drive said piston, thereby driving said flexible member toward said second end of said passage and rotating said retractor reel, tensioning an associated seatbelt;

wherein at least one of said pressure surfaces is isolated from said gas actuator when said piston is proximate said first end of said passage, and said at least one pressure surface communicates with said gas actuator when said piston is remote from said first end of said passage.

12. The seatbelt pretensioner of claim 11 wherein said piston includes an extension having a pressure surface and a body having at least a second pressure surface, said extension insertable in a complementary portion of said housing proximate said first end.

13. The seatbelt pretensioner of claim 12 wherein said extension is substantially cylindrical.

14. The seatbelt pretensioner of claim 13 wherein said extension is an annular boss having a diameter substantially equal to a diameter of said actuator.

15. The seatbelt pretensioner of claim 11 further comprising a metallic sleeve received in said housing, wherein said metallic sleeve is substantially coextensive with said passage and houses said actuator therein.

16. A seatbelt pretensioner in cooperation with a seatbelt retractor reel, the pretensioner comprising:

a housing with at least one passage, the passage having a first end and a second end, and a cylindrical restriction proximate said first end;

an actuator comprising a body and a cylindrical extension insertably received in a close-clearance fashion in said cylindrical restriction said actuator movable in said passage and having at least a first pressure surface on said extension and a second pressure surface, said second pressure surface including at least a portion located on said body;

a gas generator in fluid communication with the first end of the passage and adjacent said first pressure surface for providing a gas pressure thereto; and wherein upon pretensioner activation the gas generator initially provides a gas pressure to the first pressure surface, then to the second pressure surface, thereby driving the actuator from the first end toward the second end of said passage for a first distance at a relatively lesser velocity followed by driving said actuator a second distance at a relatively greater velocity.

17. A method of pretensioning a seatbelt, comprising the steps of:

providing a housing with at least one passage, the passage having a first end and a second end;

providing a gas generator fluidly connected with the first end of the passage for providing a gas pressure thereto;

positioning a piston having a body portion and at least one extension portion proximate the first end of the passage, wherein the piston includes a first pressure surface on the extension portion, and a second, larger pressure surface partially on the body portion and circumferential of the extension portion;

operably coupling the actuator to a seatbelt retractor webbing reel;

activating the gas generator to supply an initial force to the actuator then a greater force to the actuator, thereby driving the actuator from the first end toward the second end of the passage, to drive the seatbelt retractor webbing reel, and tension seatbelt webbing thereon.

18. The method of claim 17 wherein the step of providing a gas generator further includes positioning a gas generant adjacent the first pressure surface, the generant being ignitable to supply pressurized gas, acting on the first pressure surface to drive the piston a first distance at a lesser velocity, then acting upon the second pressure surface to drive the piston a second distance at a greater velocity.

19. A seatbelt pretensioner assembly comprising:
a housing having a passage with a first end and a second end;
a flexible member having a first end wound about a seatbelt retractor reel and a second end secured to said housing, said flexible member extending across said passage;
a piston including an extension with a first pressure surface and a body with a second pressure surface, said piston movable in said passage from said first end to said second end, and insertable in a complementary portion of said housing proximate said first end;
a gas actuator operative to drive said piston, thereby driving said flexible member and rotating said retractor reel, tensioning an associated seatbelt;
wherein at least one of said pressure surfaces is isolated from said gas actuator when said piston is proximate said first end of said passage, and said at least one pressure surface communicates with said gas actuator when said piston is remote from said first end of said passage.

20. The seatbelt pretensioner of claim 19 wherein said extension is substantially cylindrical.

21. The seatbelt pretensioner of claim 20 wherein said extension is an annular boss having a diameter substantially equal to a diameter of said actuator.

* * * * *